United States Patent [19]
Baker et al.

[11] Patent Number: 5,187,247
[45] Date of Patent: Feb. 16, 1993

[54] PROCESS FOR MAKING ELASTOMERIC ETHYLENE-ALPHA-OLEFIN POLYMERS WITH STAGE-MODIFIED VANADIUM CATALYST

[75] Inventors: Edgar C. Baker, Bridgewater; John H. Moorhouse, Kendall Park; Allen Noshay, East Brunswick, all of N.J.

[73] Assignee: Union Carbide Chemicals & Plastics Technology Corporation, Danbury, Conn.

[21] Appl. No.: 543,392

[22] Filed: Jun. 26, 1990

[51] Int. Cl.⁵ .............................. C08F 4/68; C08F 2/34
[52] U.S. Cl. .................................... 526/133; 526/129; 526/144; 526/153; 526/156; 526/169.2; 526/336; 526/901; 526/907; 502/104; 502/118; 502/128
[58] Field of Search ............... 526/129, 133, 144, 153, 526/156, 169.2, 907, 901; 502/104, 118

[56] References Cited

U.S. PATENT DOCUMENTS

| | | | |
|---|---|---|---|
| 4,508,842 | 4/1985 | Beran et al. | 502/112 |
| 4,559,318 | 12/1985 | Smith et al. | 502/110 |
| 4,657,997 | 4/1987 | Best | 526/133 X |

OTHER PUBLICATIONS

Carrick et al., *JACS*, vol. 82, p. 1502 (1960).
Karol et al., *JACS*, vol. 83, pp. 2654–2658 (1961).
Jacob et al., *Z. anorg. allg. Chem.*, 427, pp. 75–84 (1976) (abstract).

*Primary Examiner*—Fred Teskin
*Attorney, Agent, or Firm*—J. S. Piscitello

[57] ABSTRACT

An improved polymerization process for making essentially nonagglomerated ethylene polymers, especially EPR polymers, based on the use of a stage-modified high activity vanadium catalyst, under polymerization conditions that normally would yield an undesirable amount of agglomerated polymer.

12 Claims, 2 Drawing Sheets

PROCESS FOR MAKING ELASTOMERIC ETHYLENE-ALPHA-OLEFIN POLYMERS WITH STAGE-MODIFIED VANADIUM CATALYST

BRIEF DESCRIPTION OF THE INVENTION

This invention relates to an improved polymerization process for making essentially non-agglomerated ethylene polymers, especially EPR polymers, based on the use of a stage-modified high activity vanadium catalyst, under polymerization conditions that normally would yield an undesirable amount of agglomerated polymer with non-stage-modified high activity vanadium catalysts.

BACKGROUND TO THE INVENTION

There is a family of high activity vanadium catalysts that have been described for the polymerization of olefins such as ethylene and α-olefins, that are based on the use of a supported reduced and complexed vanadium halide catalyst precursor. Illustrations of these catalysts can be found in Beran et al., U.S. Pat. No. 4,508,842, patented Apr. 2, 1985. Beran et al. describe an ethylene polymerization catalyst comprising a supported precursor of a vanadium halide/electron donor complex and alkylaluminum or boron halides to form a reduced vanadium catalyst precursor, which when combined with alkylaluminum cocatalyst and alkyl halide promoter, provides enhanced polymerization and productivity plus a superior polyethylene product. According to Beran et al., the process involves polymerizing ethylene with or without at least one $C_3$ to $C_{10}$ alpha-olefin monomer in the gas phase at a temperature between about 30° C. to about 115° C. wherein the monomers are contacted with a catalyst composition comprising a vanadium complex and a modifier which are impregnated on a solid, inert carrier. Beran et al. differentiate by the use of a supported precursor, a cocatalyst and a promoter in which the supported precursor comprises a vanadium halide-electron donor reaction product and modifier impregnated on a solid, inert carrier. The reaction between the vanadium halide-electron donor complex and the modifier is described as a single stage reaction and, thus, such a vanadium catalyst precursor is herein termed a "non-stage-modified" vanadium catalyst precursor. The halogen in the vanadium halide is chlorine, bromine or iodine, or mixtures thereof. A particularly preferred vanadium halide is a vanadium trihalide, such as vanadium trichloride, $VCl_3$. The electron donor is a liquid, organic Lewis base in which the vanadium halide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, such as tetrahydrofuran ("THF"). Between about 1 to about 20, preferably between about 1 to about 10, and most preferably about 3 moles of the electron donor are complexed with each mole of vanadium used.

The disclosure of Beran et al. is incorporated herein by reference. The vanadium catalysts of Beran et al. are hereinafter characterized as the "Beran et al. Catalyst System."

There is substantial literature indicating the creation of a catalytically active vanadium by the reduction of vanadium halides to a reduced, viz. divalent, state. Carrick et al., JACS, vol. 82, p. 1502 (1960) describe the reduction of $VCl_4$ to the divalent state form of a vanadium ethylene catalyst utilizing conventional reducing agents, such as triisobutylaluminum and zinc alkyls. Karol et al., JACS, vol 83, pp. 2654–2658 (1961) discuss the partial and total reduction of vanadium halides such as $VCl_4$ to divalent structures and the catalystic activity resulting with respect to the polymerization of ethylene to polyethylene.

Jacob et al., Z. anorg. allg. Chem., 427, pp. 75–84 (1976) illustrate the complexity of such reduction reactions in the presence of THF. From the teachings of Beran et al., the resulting divalent vanadium compounds are complexes which include THF in the structure.

Cumulative to the above, Smith et al., U.S. Pat. No. 4,559,318, patented Dec. 17, 1985, describe a number of procedures for making $VX_2$, where X is halogen, which involves the reduction of $VX_4$ or $VX_3$ by reaction with reducing agents followed by the complexation of the $VX_2$ with an ether such as THF. Such is effected on a support surface.

A number of significant problems have been noted with the fluid bed operability of high activity vanadium catalysts, including the vanadium catalyst encompassed by the Beran et al. Catalyst System, in the polymerization of ethylene and α-olefins to produce elastomeric polymers, such as ethylene-propylene copolymers (EPR). These problems are oftentimes characterized by the formation of polymer chips, chunks, sheets and lumps in the fluid bed, which in some cases can lead to sudden defluidization. Another set of problems can occur with high activity vanadium catalysts on starting up of the fluid bed and/or during transitioning of the reactor. For example, start-up of a gas-fluidized polymerization reactor goes through a sensitive stabilization period due to impurities trapped in the reaction system. Low (ppm) level impurities have a deactivating influence on the catalyst and contribute to polymer particle adhesion. The net effect is that layers of polymer fines containing high concentrations of catalyst are formed on reactor surfaces and in places where mixing forces are reduced. When polymerization is then initiated, localized hot spots can result, with consequent chunking and eventual reactor shutdown. Therefore, it is desirable to have a catalyst that has a gradual kinetic profile which minimizes sudden acceleration of polymerization as reaction is initiated.

Although such difficulties have occurred in a variety of ethylene polymerization operations with such catalysts, they have been most pronounced under EPR operating conditions, especially under EPM operating conditions, where there are relatively high concentrations of propylene in the reactor and a low-crystallinity resin is being produced. In this case, these difficulties are believed to stem from a number of contributing factors, such as (i) the magnitude of the initial kinetic spike in the standard catalyst reaction profile, which is much greater with propylene as a comonomer than with α-olefins higher than propylene and (ii) the elastomeric nature of the EPM resin being produced, which can soften, become sticky and agglomerate due to the increase in temperature associated with hot spots and reaction surges.

Important variables in influencing the degree of stickiness leading to more or less agglomeration are the polymerization reaction temperature and crystallinity of the polymer being produced. Higher temperatures increase the propensity to form agglomerates, and less crystalline polymers, such as ultra low density polyethylene, ethylene/propylene copolymers (EPM), and ethylene/propylene/diene monomer (EPDM), usually display a greater tendency to agglomerate. EPM and EPDM polymers having a density less than 0.88 g/cc are noted for their capacity to soften and agglomerate.

Those polymerization conditions which result in stickiness and agglomeration of the polymer are termed "polymerization conditions that normally would yield an undesirable amount of agglomerated polymer with non-stage-modified high activity vanadium catalysts," in order to characterize this invention so as to compensate for the variety of reactants, polymerization conditions and catalyst compositions encompassed herein.

Elastomeric ethylene-alpha-$C_3$-$C_{18}$ olefin copolymers encompass ethylene-propylene copolymers (EPR) (inclusive of EPM or EPDM copolymers), ethylene-butene copolymers, and the like. Illustrative of such polymers are those comprised of ethylene and propylene or ethylene, propylene and one or more dienes. Copolymers of ethylene and higher alpha-olefins such as propylene often include other polymerizable monomers, such as non-conjugated dienes, illustrated by the following:

straight chain acylic dienes such as: 1,4-hexadiene, 1,6-octadiene, and the like;

branched chain acyclic dienes such as: 5-methyl-1,4-hexadiene, 3,7-dimethyl-1,6-octadiene, 3,7-dimethyl-1,7-octadiene and the mixed isomers of dihydromyrcene, dihydroocinene, and the like;

single ring alicyclic dienes such as: 1,4-cyclohexadiene, 1,5-cyclooctadiene, 1,5-cyclododecadiene, and the like;

multi-ring alicyclic fused and bridged ring dienes such as: tetrahydroindene, methyltetrahydroindene, dicyclopentadiene, bicyclo(2,2,1)-hepta-2,5-diene, alkenyl, alkylidene, cycloalkenyl and cycloalkylidene norbornenes such as 5-methylene-2-norbornene (MNB), 5-ethylidene-2-norbornene (ENB), 5-propyl-2-norbornene, 5-isopropylidene-2-norbornene, 5-(4-cyclopentenyl)-2-norbornene, 5-cyclohexylidene-2-norbornene, and the like.

Of the non-conjugated dienes typically used to prepare these copolymers, dienes containing a double bond in a strained ring or α position, are preferred. The most preferred dienes are 5-ethylidene-2-norbornene (ENB) and 1,4-hexadiene. The amount of diene, on a weight basis, in the copolymer can range from about 0% to about 20% with about 0% to about 15% being preferred. The most preferred range is 0% to 10%.

The preferred EPR copolymers are copolymers of ethylenepropylene (EPM) or ethylene-propylene-diene (EPDM). The average ethylene content of the copolymer could be as low as about 10% on a weight basis. The preferred minimum is about 25%. A more preferred minimum is about 30%. The maximum ethylene content may be about 85% on a weight basis. The preferred maximum is about 80%, with the most preferred maximum being about 75 weight % ethylene.

High activity vanadium catalysts would be desirable for EPR products because they achieve efficient comonomer incorporation in the polymers with relatively random distribution of the comonomers in the polymer structure. However, their above-noted deficiencies for producing EPR polymers in a fluid bed, such as producing a high initial surge in the polymerization rate which causes exothermic temperature excursions that can soften the polymer in the course of polymerization and foul the bed by virtue of resin agglomeration, thereby degrading fluid bed operability, has impaired their use for such applications. The initial surge is strongest when propylene is one of the comonomers polymerized with ethylene and is present in relatively high concentrations. The problem is magnified in EPR copolymers because of their low softening temperature. Thus, there is a need for a high activity vanadium-based catalyst system that can produce EPR-type polymers at acceptable productivity levels without inducing agglomeration. There is also a need for a high activity vanadium catalyst system that is effective in producing a variety of ethylene-containing polymers with low softening temperatures.

As part of the prior art to the invention, commercial production of a copolymer of ethylene and 1-butene was practiced using a stage-modified Beran et al. Catalyst System, as described hereinafter, under conditions where the properties of the copolymer were a density of 0.898 g/cc. and a melt index of 0.47 dg/min. It was made concurrently with the same copolymer of ethylene and 1-butene employing a straight (non-stage-modified) Beran et al. Catalyst System under the same operating conditions. No difference in the operation of polymerization reactions with the two catalysts were anticipated and none were found. The lack of difference shows that the conditions were not such as to cause reaction surges leading to agglomeration of the polymer being produced.

It would be extremely beneficial to conduct polymerizations of elastomeric resins at temperatures close to or even above the softening point of the sticky polymer, since it is well known that increases in polymerization temperature generally enhance the yield of product in relation to the catalyst, and, in addition, more economical removal of the heat of the reaction is achievable and purging of residual unreacted monomers from the product becomes more efficient. Therefore it is desirable to have a catalyst that has a gradual kinetic profile which minimizes any sudden acceleration of the reaction as polymerization is initiated with that catalyst.

The Invention

There is described herein a process that avoids the noted difficulties in fluid bed operability of high activity vanadium catalysts under EPR conditions, and provides a gradual kinetic profile when there are relatively high concentrations of propylene in the reactor and a low-crystallinity to wholly amorphous, elastomeric polymer is being produced.

This invention relates to an improved polymerization process for making essentially non-agglomerated ethylene polymers, especially ethylene-α-olefin copolymers such as EPR polymers, based on the use of a stage-modified high activity vanadium catalyst, under polymerization conditions that normally would yield an undesirable amount of agglomerated polymer with non-stage-modified high activity vanadium catalysts.

The catalyst used in the process of the invention involves modification of high activity vanadium catalysts such as the Beran et al. Catalyst System, by use of a multistage reduction of the vanadium component thereof to produce what is herein termed a "stage-modified" catalyst, even though the stage modification relates to a portion of the total catalyst entity comprising catalyst precursor, cocatalyst and promoter. The invention relates to the use of a vanadium complexed component for the catalyst precursor where the vanadium complexed component is obtained by incrementally reducing, in distinct stages interrupted by drying, a vanadium halide component through reaction with a reducing agent, such as the Group 13 element (new notation of the Periodic Table Of The Elements, see Chemical and Engineering News, 63(5), 27, 1985)[1] containing modifier of the Beran et al. Catalyst System.

1. As noted in CRC Handbook of Chemistry and Physics, 67th Edition, CRC Press Inc., Boca Raton, Fla., inside frontcover.

In accordance with the invention, the high activity vanadium catalyst employed in the process of the invention is distinguished by having the vanadium modified by a multistage reduction (also referred to as reduced), in which the vanadium component of the precursor is first reduced to an intermediate stage (such as to a level of about 0.15 to about 0.9–1.0 mmoles of Group 13 element per gram of supported precursor), dried, reslurried and further reduced (such as by adding more modifier and/or converting unreacted modifier present so as to achieve a total level of about 0.9–1.0 to about 3.0 mmoles of Group 13 element per gram of the finally reduced supported presursor). This modification of the precursor yields significantly improved reactor operability and continuity under EPR conditions without adversely affecting the typical good monomer response for such catalysts.

The catalyst precursor is a supported, electron donor-complexed vanadium$^{(<3)}$ formed by multistaging the reduction of the vanadium component therein to a valence less than 3. In the terms of this invention, vanadium components are divided between non-reduced and reduced. This serves to distinguish between vanadium$^{(+3, +4 \text{ and } +5)}$ components, which are termed the non-reduced species, and vanadium components which have a lower valence state, including vanadium components that possess such a lower valence state containing as well some vanadium$^{(+3, +4 \text{ or } +5)}$ species, which are termed the reduced components. Such reduced vanadium components are characterized by the formula vanadium$^{(<3)}$. The multistage reduction of the vanadium component carries the reduction of the vanadium component through intermediate stages of reduction defined by the amount of reducing agent employed in modifying the vanadium. A stage of reduction is completed when the modification of the vanadium component is completed. Such a catalyst is viewed in terms of this invention as characterized by essentially all of the complexed vanadium being of the formula vanadium$^{(<3)}$.

In another aspect of this invention, the process relates to the polymerization of ethylene and α-olefin comonomers with a Beran et al. Catalyst System, stage modified to possess a vanadium component of the formula vanadium$^{(<3)}$, to form an ethylene and α-olefin copolymer under polymerization conditions that normally would yield an undesirable amount of agglomerated polymer with non-stage-modified high activity vanadium catalysts.

In the preferred practice of the invention, ethylene, propylene, an optional additional α-olefin and/or a diene, are copolymerized in a fluid bed in the typical manner, where the improvement comprises using as the catalyst, a Beran et al. Catalyst System, stage modified to possess a vanadium component of the formula vanadium$^{(<3)}$.

Particularly preferred polymers produced by the process of the invention include those normally viewed to be wholly or partly elastomeric polymers, illustrated by ethylene/propylene rubbers, ethylene/propylene/diene rubbers (e.g., ethylene/propylene/ethylidenenorbornene and ethylene/propylene/hexadiene), ethylene/butene rubbers, ethylene/butene/diene rubbers, and very low density ethylene polymers which are not wholly elastomeric, such as, ethylene/propylene copolymers, and ethylene/propylene/diene terpolymers (e.g., ethylene/propylene/ethylidenenorbornene and ethylene/propylene/hexadiene terpolymers).

DETAILED DESCRIPTION OF THE INVENTION

Figure 1:
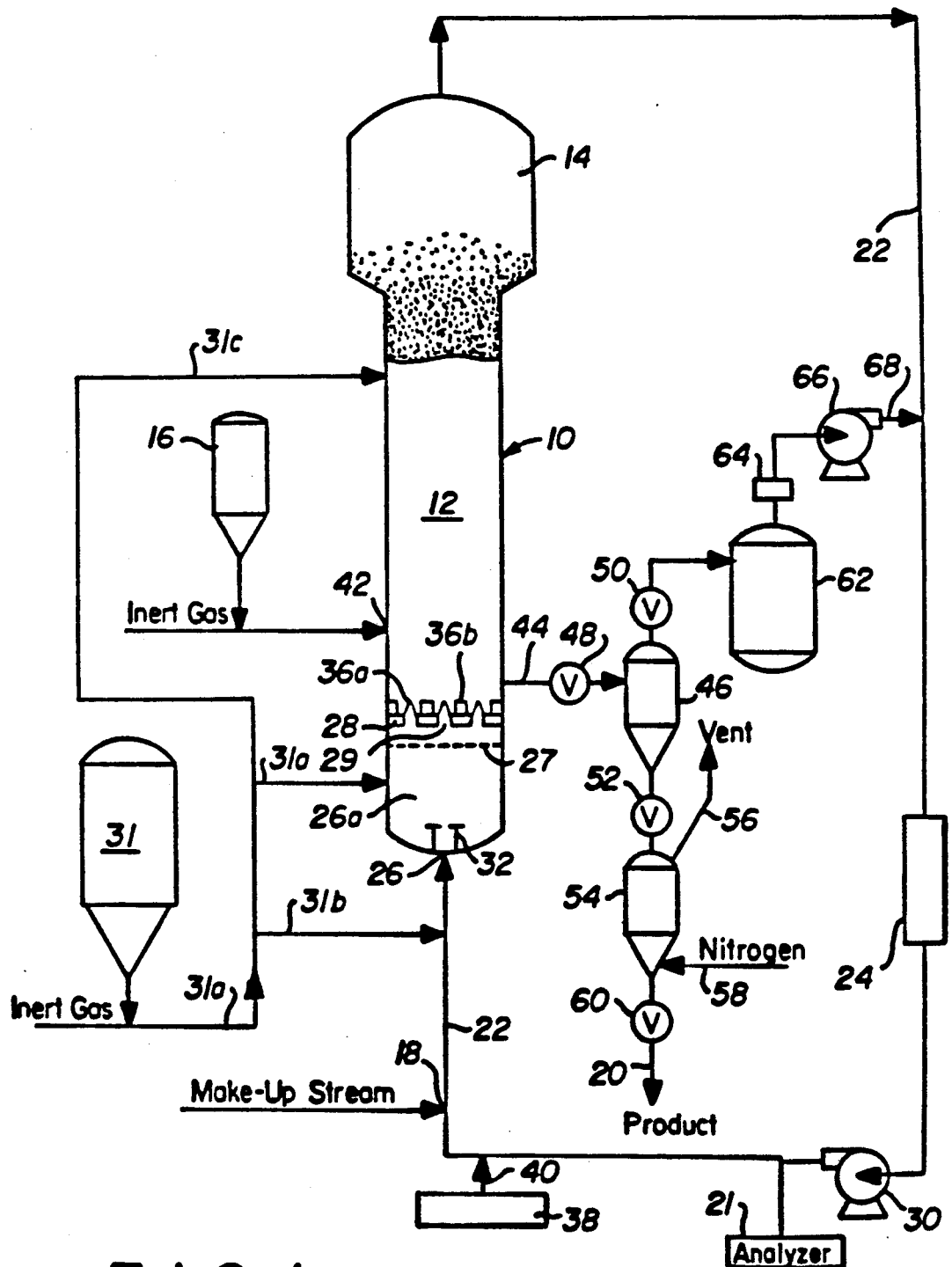
FIG. 1 is a schematic flow drawing of a fluid bed apparatus for carrying out the process of the invention.

This invention introduces a number of significant advantages over the conventional Beran et al. Catalyst System for EPR polymerization. For example, the catalyst of the invention provides a different kinetic response than conventionally made Beran et al. Catalyst System. Consequently, the catalyst of the invention is viewed as being structurally more uniform and this eliminates the formation of catalyst heterogeneity that induces hot spotting. As a result, the invention leads to better reactor operability, less offgrade product, and faster and more trouble-free start-ups of the reactors. This invention provides an unexpected solution to the problems caused by the initial surge in polymerization rate of the conventional high activity vanadium catalysts. In addition, this invention produces EPR products with cure behavior and properties superior to comparable products produced using the Beran et al. Catalyst System.

THE SUPPORTED PRECURSOR

The Vanadium Component

The supported precursor is a vanadium compound and modifier impregnated on a solid, inert carrier. The vanadium compound in the precursor is the reaction product of a vanadium$^{(+3 \text{ and/or } +4)}$ halide and an electron donor. The halogen in the vanadium$^{(+3 \text{ and/or } +4)}$ halide is chlorine, bromine or iodine, or mixtures thereof. A particularly preferred vanadium halide is a vanadium trihalide, such as vanadium trichloride, $VCl_3$. The concentration of vanadium on the supported precursor is sufficient to provide from about 0.25 to about 7.5 weight percent vanadium.

The Electron Donor

The electron donor is a liquid, organic Lewis base in which the vanadium$^{(+3 \text{ and/or } +4)}$ halide is soluble. The electron donor is selected from the group consisting of alkyl esters of aliphatic and aromatic carboxylic acids, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, preferably between about 1 to about 10, and most preferably about 3 moles of the electron donor are complexed with each mole of vanadium used.

The Solid, Inert Carrier

The carrier is a solid, particulate porous material inert to the polymerization and, desirably, is a silica-, alumina- or aluminosilicate-, i.e., oxides of silicon or aluminum or mixtures thereof, containing material, preferably a siliceous-containing particulate material. Optionally, the carrier may contain additional materials such as zirconia, thoria or other compounds chemically inert to the polymerization. The carrier is used as a dry powder having an average particle size of between about 10 to 250, preferably about 20 to about 200, and most preferably about 30 to about 100 microns. The porous carrier has a surface area of greater than or equal to about 3 and preferably greater than or equal to about 50 m²/g. A preferred carrier is silica having pore sizes of greater than or equal to about 80, and preferably greater than or equal to about 100 angstroms. The carriers for these applications are dried to remove the free water and much of the bound water. Drying the carrier typically requires heating it as a fluid bed using an inert atmosphere such as air, carbon dioxide or nitrogen, for about four (4) hours and longer, such as 6–10 hours, at 600°–800° C., followed by purging with nitrogen.

The amount of carrier used is that which will provide a vanadium content of between about 0.25 to about 7.5 weight percent vanadium on the precursor, and preferably between about 0.5 to about 6.0 weight percent vanadium, and most preferably about 1.0 to about 5.0 weight percent vanadium.

The Modifier

The modifier used in forming the precursor has the formula:

$$MX_aR_{(3-a)} \tag{I}$$

wherein M is either boron or Al and wherein each R is independently alkyl provided that the total number of aliphatic carbon atoms in any one R group may not exceed 14; X is chlorine, bromine or iodine; and a is 1–2 with the provision that when M is boron, a is 3. Preferred modifiers include $C_1$ to $C_6$ alkylaluminum mono- and dichlorides and boron trichloride. A particularly preferred modifier is diethyl aluminum chloride. A total of about 0.15 to about 3.0, and preferably about 0.35 to about 2.5, mmoles of M per gram of precursor may be used.

The Cocatalyst

The cocatalyst has the formula:

$$AlR_3 \tag{II}$$

wherein R is as previously defined in the definition of M in formula I, supra. Preferred cocatalysts include $C_2$ to $C_8$ trialkylaluminum compounds. A particularly preferred cocatalyst is triisobutyl aluminum. Between about 5 to about 1200, and preferably between about 10 to about 200 moles of cocatalyst are used per mole of vanadium.

The Promoter

The promoters used in the practice of the invention may be of two types, one which is supplied separately from the precursor, and another which is a molecularly structural component of the precursor and thus is not separately fed to the polymerization reaction, but instead is part of the precursor composition fed to the reaction. The latter is termed a bound promoter while the former is simply termed promoter.

Promoter

The promoter is a halogenated organic compound such as a halohydrocarbon of the formula:

$$R'_bCX'_{(4-b)} \tag{III}$$

wherein R' is hydrogen or unsubstituted or halosubstituted lower alkyl, i.e., up to about $C_6$ containing alkyl; X' is halogen; and b is 0, 1 or 2. Preferred promoters include fluoro, chloro or bromo substituted ethane or methane having at least 2 halogens attached to a carbon atom. Preferred promoters include $CCl_4$, $CHCl_3$, $CH_2Cl_2$, $CBr_4$, $CFCl_3$, $CH_3CCl_3$, and $CF_2ClCCl_3$. Particularly preferred promoters are difluorotetrachloroethane ($CF_2ClCCl_3$), 1,1,1,trichloroethane, ($CH_3CCl_3$), and chloroform ($CHCl_3$). Between about 0.1 to about 10, and preferably between about 0.2 to about 2, moles of promoter are used per mole of cocatalyst.

The Bound Promoter

The promoter may comprise the haloalcohol metalate moiety of the structural formula:

$$-\underset{(I)_x}{Me}(-O-R^0R^{\Diamond}_b\ CX^0_{(3-b)})_y \tag{IV}$$

wherein Me is a metal such as those from Groups 1, 2, 12 and 13 (new notation) of the Periodic Table Of The Elements and includes, for example, the alkali metals (lithium, sodium, potassium, rubidium and cesium), the alkaline earth metals (beryllium, magnesium, calcium, strontium and barium), zinc, cadmium, mercury, boron, aluminum, gallium, indium, tantalum, and the like; or Me is bonded to a siloxy unit of the carrier, where the carrier is silica containing, as derived from the in situ reaction of one such other haloalcohol metalates with silanol groups on the surface of the silica carrier; x is equal to the remaining valences of Me and y is equal to the free valence of Me less the value of x; $R^{\Diamond}$ is hydrogen, unsubstituted or halosubstituted lower alkyl, i.e., up to about $C_6$ containing alkyl, aromatic such as phenyl, benzyl, and the like, or cycloalkyl, b is 0 or 1, $X^0$ is one of chlorine, bromine, fluorine or iodine, and $R^0$ is a divalent organic group bonded to both the 0 and to the CX' moieties. $R^0$ may be aliphatic or aromatic. Further description of these bound promoters can be found in copending application 502,678, filed Apr. 2, 1990. The description therein of bound promoters is incorporated herein by reference.

Stage Modification Procedure

The general procedure of forming the stage-modified catalyst precursor of this invention involves a sequence of steps starting from the formation of the complexed and supported vanadium component described by Beran et al.. The supported vanadium component is dried, and then it is contacted with modifier, and dried again, resulting in a first stage of reduction. The dried, first-stage supported precursor is further contacted with modifier, as required, and dried again to yield a further reduced, supported catalyst precursor. This procedure can be repeated until the desired state of reduction of the vanadium is achieved. Usually, two reductions are suitable for achieving the modified catalyst of this invention.

For example, the supported vanadium component is initially reduced in a standard mix tank treatment to form a Beran et al. Catalyst System type precursor conforming to a modifier concentration, in the case of an aluminum containing modifier, resulting in about 0.5 to about 2.5 weight percent Al in the precursor and containing about 0.25 to about 7.5 weight percent vanadium based on the weight of the combination of vanadium component, the electron donor and support. This catalyst precursor is then subjected to a second mix tank treatment with sufficient modifier, such as diethylaluminum chloride, to bring the final catalyst precursor to an aluminum content of about 2.5 to about 8.0 weight percent. It should be appreciated that the amount of vanadium present is dictated by catalytic considerations and the amount of aluminum present is dictated by that amount necessary for the desired extent of reduction (e.g., the reaction of the aluminum modifier with the support and with the vanadium catalytic component).

The catalyst composition is produced by first preparing the supported precursor. The carrier is combined with the complexed vanadium component in the conventional manner. For example, in one embodiment, the complexed vanadium component is prepared by dissolving the vanadium trihalide in the electron donor at a temperature between about 20° C. up to the boiling point of the electron donor for a few hours. Preferably, mixing occurs at about 65° C. for about 3 hours. The complexed vanadium component so produced is then impregnated onto the carrier. Impregnation may be effected by adding the carrier as a dry powder or as a slurry in the electron donor or other inert solvent. The liquid is removed by drying at less than about 100° C. for a few hours, preferably between about 45° to 70° C. for about 3 to 6 hours. The modifier, either reacted with the haloalcohol or not, is dissolved in an inert solvent, such as a hydrocarbon, and is then mixed with the vanadium impregnated carrier. The liquid is removed by drying at temperatures of less than about 70° C. for a few hours, preferably at about 45° C. for about 3 hours. This procedure is repeated to effect the rereduction of the precursor by the addition of more of the modifier, such as diethylaluminum chloride, following the standard procedures. The cocatalyst and any unbound promoter is added to the supported precursor either before and/or during the polymerization reaction.

Polymerization

Polymerization is conducted in the gas phase using well established procedures in the art. It is preferred to polymerize in a dynamic bed mode, such as in a continuous, fluidized bed. Using such a procedure, portions of the catalyst composition and monomers are fed to a reactor vessel from which ethylene polymer product is continuously removed. The density of the ethylene copolymer produced may be varied over a wide range depending upon the amount of alpha-olefin comonomer addition and upon the particular comonomer employed.

The operating temperature will typically range from between about 0° C. to about 115° C. Preferred operating temperatures will vary depending upon the polymer density which is desired. High density polymers of greater than about 0.94 g/cc are produced at operating temperatures of between about 90° to about 110° C., and preferably at about 100° C. Low density polyethylenes ranging in density from about 0.91 to about 0.94 g/cc are preferably produced at an operating temperature of between about 75° to about 90° C. Very low density polyethylenes ranging in density from about 0.88 g/cc to about 0.91 g/cc are preferably produced at an operating temperature of between about 50° C. to about 75° C. EPR polymers are preferably produced at an operating temperature of between about 10° C. to about 80° C. using procedures as described herein. The fluid bed reactor is operated at pressures of up to about 1000 psig and preferably between about 250 to about 500 psig.

A chain transfer agent, such as hydrogen, is used to terminate the polymerization. The ratio of hydrogen to ethylene will vary between about 0.0002 up to about 2.0 moles of hydrogen per mole of monomers.

The fluid bed reactor is generally operated under polymerization conditions that normally would yield an undersirable amount of agglomerated polymer with non-stage-modified high activity vanadium catalysts and this may include temperature conditions near or below the softening temperature of the polymer particles or above the softening temperature of the polymer particles. In addition, operating at temperature condition above the softening temperature of the polymer particles can be further enhanced by employing inert particulate materials as described in copending application Ser. No. 413,704, filed Sep. 28, 1989,[2] the disclosure of which relating to the use of inert particulate materials is incorporated herein by reference. Other types of conventional reactors for the gas phase production of, for example, polyethylene or ethylene copolymers and terpolymers can also be employed. At the start up, the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, makeup feed, and cycle (recycle) gas, i.e., monomers and, if desired, modifiers and/or an inert carrier gas. A typical cycle gas is comprised of ethylene, nitrogen, hydrogen, propylene, cocatalyst, promoter, and optionally, diene monomers.

2. The inert particulates are introduced at the bottom of the reactor or to the recycle line directed to the bottom of the reactor as described in said copending application or fed directly into the polymer bed. The inert particulate materials that may be employed are materials which are chemically inert to the reaction. Examples of inert particulate materials include carbon black, silica, clays, and other like materials. The amount of inert particulate material utilized typically depends on the choice of material and the polymer being produced. For example, carbon black or silica inert material can be employed in amounts of about 0.3% to about 50% by weight, preferably about 5 to about 30%, based on the weight of the final product produced. When clays are employed, the amount can range from about 0.3% to about 80% based on the weight of the final product, and preferably about 12 to 75% by weight. It is preferred to purge the inert particulate material prior to entry into the reactor with nitrogen gas and heating, to remove traces of moisture and oxygen.

A fluidized bed reaction system which is particularly suited to production of polymers by the practice of the process of the present invention is illustrated in FIG. 1. With reference thereto and particularly to FIG. 1, reactor 10 comprises a reaction zone 12 and velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably, the SGV is at least 1.0 ft/sec. above the minimum flow for fluidization, and is preferably from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" and to entrap and distribute the particulate catalyst through the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalyst precursors used are often sensitive to oxygen, thus the catalyst precursor used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 450 to about 2000 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

The compressor 30 and the heat exchanger 24 may be positioned as shown in FIG.1 or their sequence may be reversed. Make-up fluid can be fed at point 18 via recycle line 22 although it is also possible to introduce make up fluid between heat exchanger 24 and velocity reduction zone 14 in recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the dispenser 38, preferably after the compressor 30.

To ensure complete fluidization, the recycle stream and, where desired, part of the make-up stream are returned through recycle line 22 to the reactor at point 26 below the bed. Preferably, there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector 32 comprises a supported annular disc distanced from the reactor inlet 26 by spacers 32a. It divides the entering recycle stream into a central upward flow stream and an upward peripheral annular flow stream along the lower side walls of the reactor. The flow streams mix and then pass through protective screen 27, the holes or ports 29 of the distributor plate 28 and the angle caps 36a and 36b—which are secured to the upper surface of the distributor plate—and eventually into the fluidized bed.

The central upward flow stream in the mixing chamber 26a assists in the entrainment of liquid droplets in the bottom head or mixing chamber and in carrying the entrained liquid to the fluidized bed section during a condensing mode of reactor operation. The peripheral flow assists in minimizing build-up of solid particles in the bottom head because it sweeps the inner surfaces of the reactor walls. The peripheral flow also contributes to the re-atomization and re-entrainment of liquid accumulations at the walls or at the bottom of the diffuser mixing chamber—as might occur when there is a high level of liquid in the recycle stream. The annular deflector 32 permits a reactor to be operated without the problems of liquid flooding or excessive build up of solids at the bottom of the reactor.

The temperature of the bed is primarily dependent on three factors: (1) the rate of catalyst precursor injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce bed temperature. The rate of catalyst precursor injection serves to control the rate of polymer production. Control over bed temperature under steady state conditions is effected by constantly removing heat generated by the reaction. "Steady state" defines a state of operation where there is no change in the system with time. The amount of heat generated in the process is balanced by the amount of heat being removed and the total quantity of material entering the system is balanced by the amount of material being removed. As a result, the temperature, pressure, and composition of the system does not change with time. No noticeable temperature gradient exists at the upper portion of the bed. A temperature gradient exists in the bottom of the bed in a layer or region extending above the distributor plate, e.g., for about 6 to about 12 inches, as a result of the difference between the temperature of the inlet fluid and temperature of the remainder of the bed. However, in the portion or region above this bottom layer, bed temperature is essentially constant.

Good gas distribution plays an important role in the efficient operation of the reactor. The fluidized bed contains growing and formed particulate polymer particles, as well as catalyst particles. As the polymer particles are hot and possibly active, they must be prevented from settling, because if a quiescent mass is allowed to exist, any active catalyst present can continue to react and cause fusion of the polymer particles resulting, in an extreme case, in the formation of a solid mass in the reactor which can only be removed with a great difficulty and at the expense of an extended downtime. Since the fluidized bed, in a typical commercial size reactor, may contain many thousand pounds of solids at any given time, the removal of a solid mass of this size would require a substantial effort. It is therefore important to diffuse recycle fluid through the bed at a rate sufficient to maintain fluidization throughout the bed.

Any fluid inert to the catalyst and reactants and which, if a liquid, will volatilize under the conditions present in the fluidized bed, can also be present in the recycle stream. Cocatalyst and promoter (when not bound to the support) are preferably added to the reaction system downstream from compressor 30. Thus the materials may be fed into the recycle system from dispenser 38 through line 40 as shown in FIG. 1.

The fluid bed reactor may be operated at pressures of up to about 1000 psig. The reactor is preferably operated at a pressure of from about 250 to about 500 psig, with operation at the higher pressures in such ranges favoring heat transfer since an increase in pressure increases the unit volume heat capacity of the gas.

The catalyst precursor is injected intermittently or continuously into the bed at a desired rate at a point 42 which is above the distributor plate 28. Preferably, the catalyst precursor is injected at a point in the bed where good mixing with polymer particles occurs. Injecting the catalyst precursor at a point above the distributor plate is an important feature for satisfactory operation of a fluidized bed polymerization reactor. Since catalysts are highly active, injection of the catalyst precursor into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots." Injection of the catalyst precursor into the reactor is preferably carried out in the lower portion of the fluidized bed to provide uniform distribution and to minimize catalyst carryover into the recycle line where polymerization may begin and plugging of the recycle line and heat exchanger may eventually occur.

Inert particulate materials are optionally introduced into the reactor from vessel 31 through line 31a together with inert gas or alternatively through 31b where it is joined with recycle line 22 or alternatively through 31c directly into the bed. More than one introduction point may be used during normal operation.

A gas which is inert to the catalyst, such as nitrogen or argon, is preferably used to carry the catalyst precursor and the optional inert particulate material into the bed.

The rate of polymer production in the bed depends on the rate of catalyst precursor injection and the concentration of monomer(s) in the recycle stream. The production rate is conveniently controlled by simply adjusting the rate of catalyst precursor injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst precursor injection.

On discharge of particulate polymer product from the reactor 10, it is desirable, and preferable, to separate fluid from the product and to return the fluid to the recycle line 22. There are numerous ways known to the art to accomplish this. One system is shown in FIG. 1. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through a filter 64 and thence through surge tank 62, a compressor 66 and into recycle line 22 through line 68.

In a typical mode of operation, valve 48 is open, and valves 50 and 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

EXAMPLES

Precursor Preparation Procedure

To a vessel containing anhydrous THF is added sufficient $VCl_3$ to produce a solution containing 0.08 millimole V/g solution. The mixture is stirred at reflux for 4 hours under a nitrogen blanket to dissolve all the $VCl_3$. To this solution is added sufficient silica (dehydrated by heating to 600° C.) to give a vanadium content of 0.30 millimole/g, and stirring is continued for 30 minutes at 60° C. The pressure in the vessel is then reduced to 300 mm Hg, and the solution dried to the mud stage at 70° C. A nitrogen purge is then applied for several hours, resulting in a free-flowing solid catalyst precursor complex. This solid is removed from the vessel and stored under nitrogen.

The modifier is introduced by slurrying the dried precursor complex in isopentane under a nitrogen blanket. Diethylaluminum chloride (DEAC), as a 10% solution, is then added in sufficient amount to provide the desired aluminum content. The mixture is stirred at 30° C. for 60 min, and then dried as above at a jacket temperature of 55° C. until the product is a free-flowing solid. This solid is removed from the vessel and stored under nitrogen.

If a second modification step is desired, the above catalyst precursor is reslurried in isopentane, additional diethylaluminum chloride added, and the mixture again dried to a free-flowing powder and stored under nitrogen.

POLYMERIZATION PROCEDURES OF THE EXAMPLES

Small Scale Polymerization Procedure

A 1-liter autoclave reactor is initially purged with nitrogen and heated to an internal temperature of 100° C. for at least 15 minutes under a slow, continuous nitrogen purge. The reactor is then cooled to 85° C. and 200 grams of dehydrated sodium chloride (dried under vacuum at 115° C. for at least 12 hours) is taken from a vacuum oven while hot and added to the reactor through a ½ inch port under a nitrogen flow. The salt bed is stirred at 300 rpm and purged with nitrogen for an additional 15 minutes. The reactor jacket is then cooled to 6°–8° C.

At a jacket temperature of 10° C., approximately 0.017 millimole of catalyst precursor is added to the reactor via the ½ inch port from a standard catalyst precursor addition tube while maintaining very slow stirring. Triisobutylaluminum (TIBA), as a 25 weight percent solution in hexane, and $CHCl_3$, as a 1M solution in hexane, are then charged to a nitrogen-purged 4 oz bottle in a 50:1 Al/V mole ratio and a 1:1 $Al/CHCl_3$ mole ratio, along with sufficient additional hexane to make a total of 7 ml of liquid. At a reactor jacket temperature of 15° C., this mixture is charged to the reactor and the ½ inch port is tightly capped. The reactor is purged briefly with nitrogen through the vent line, sealed and the stirring speed increased to 300 rpm.

A mixture of ethylene, propylene and hydrogen with a $C_3/C_2$ mole ratio of 0.40 and an $H_2/C_2$ mole ratio of 0.002 is fed to the reactor at an ethylene flow of 3 liters/min until the reactor pressure reaches the preset limit of 120 psig, at which point the flow drops momentarily to near zero. As polymerization commences, both flow and internal temperature increase. At this point, the hydrogen is turned off, the $C_3/C_2$ mole ratio is adjusted downward to a value of 0.23, and the jacket temperature is adjusted to bring the internal temperature to 30° C. The gas mixture is fed on demand for 60 minutes, and the reaction is then terminated by stopping the monomer flow. The ethylene flow as a function of time (kinetic profile) is monitored and recorded throughout the run.

Large Scale Polymerization Procedure

In this procedure, the fluid bed reactor system used was a simplified version of fluid bed reactor system described in detail above and in FIG. 1 minus such items as the fluid flow deflector 32, product surge tank 54, recycle compressor 66 and surge tank 62, as well as their accessory components. In carrying out the process, the density of the EPR polymer and the propylene content in the EPR polymer were controlled by controlling the partial pressure of propylene, more specifically the molar ratio of propylene to ethylene ($C_3/C_2$). The higher the ratio in the reactor, the lower the density of the polymer or the higher the propylene content in the polymer to be produced. The melt index was controlled by controlling the molar ratio of hydrogen to ethylene ($H_2/C_2$). The higher the molar ratio in the reactor, the higher the melt index of the EPR to be produced. The diene used for the production of EPDM was 5-ethylidene-2-norbornene (ENB).

Since only small amounts of the separately added cocatalyst and promoter are needed for the polymerization reaction, typically 5 to 20% by weight solutions in isopentane of each were made and fed to the reaction to facilitate the control of the feed rates.

| Polymer Properties and Test Procedures | |
|---|---|
| Property | Procedure |
| Density (g/cc) | ASTM-1505, using ASTM-D-1928 (Procedure C) plaque preparation. |
| Melt Index (dg/min) | ASTM-D-1238, Condition E. |
| Propylene Content (weight percent propylene) | Measured by Carbon-13 NMR. |

EXAMPLES 1-4

Figure 2:
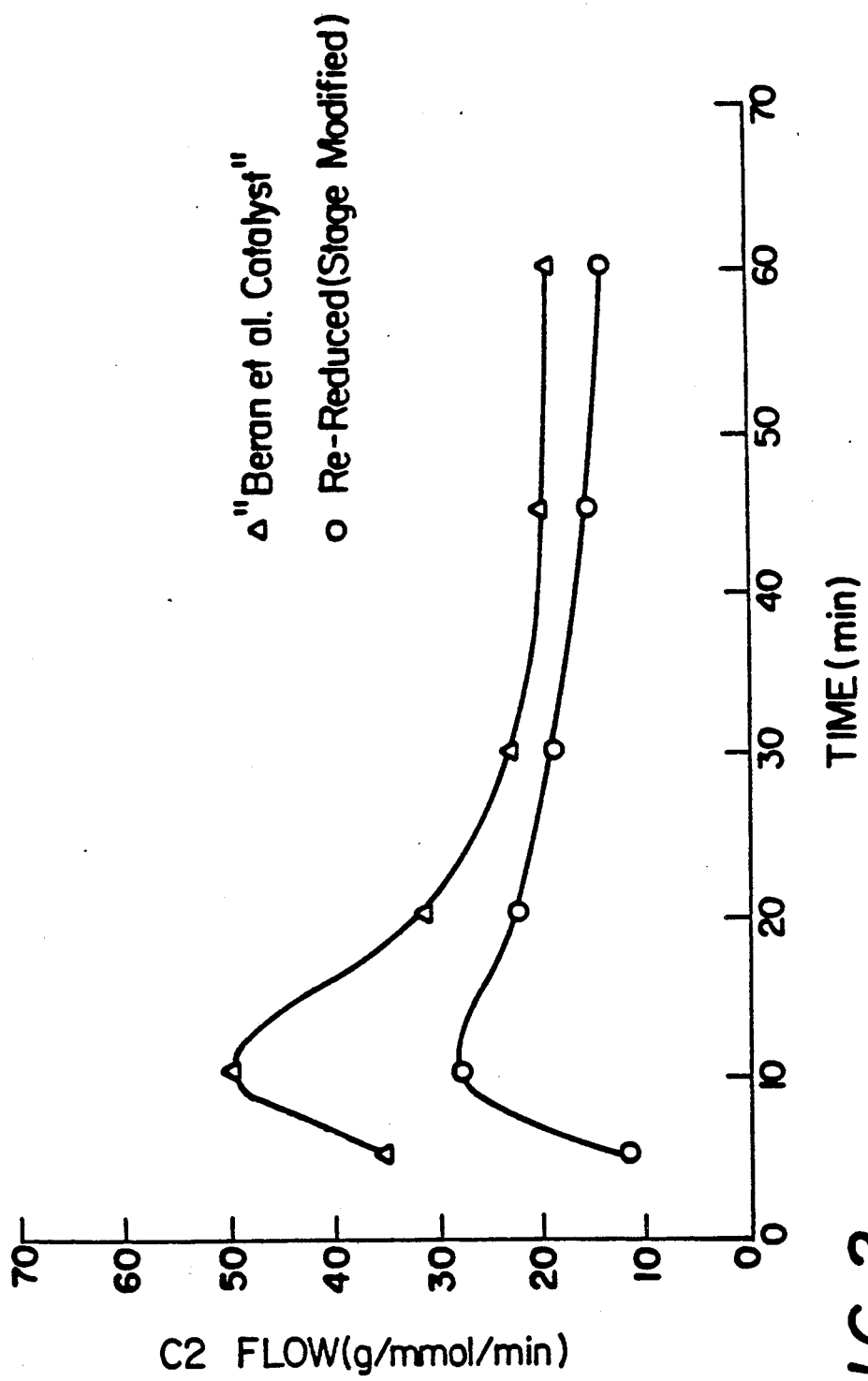
FIG. 2 illustrates the kinetic profile of a typical EPM polymerization employing non-rereduced catalyst and rereduced catalyst in accordance with this invention.

Small scale polymerizations were conducted as described above with several different catalyst precursor preparations, as indicated in Table 1 below. Profiles with a strong initial surge and significant subsequent decay are categorized as Type A and profiles with a low initial surge and little subsequent decay are categorized as Type B, as shown in FIG. 2. In all cases, single-step modification of the catalyst precursor resulted in Type A kinetic profiles and multi-step (staged or rereduced) modification produced Type B kinetic profiles. The following examples also demonstrate that the good comonomer response of the non-stage-modified catalyst is not adversely affected by staged modification.

TABLE 1

| SMALL SCALE POLYMERIZATIONS | | | | |
|---|---|---|---|---|
| Example | 1 | 2 | 3 | 4 |
| Catalyst Precursor | | | | |
| Modifier | DEAC | DEAC | DEAC | DEAC |
| Number of Modification Stages | 1 | 2 | 2 | 2 |
| V (wt. %) | 1.4 | 1.5 | 1.4 | 1.4 |
| Al (wt. %) Stage 1 | 3.2 | 1.6 | 0.8 | 1.1 |
| Total Al (wt. %) Stage 2 | — | 3.2 | 3.5 | 3.8 |
| Polymerization | | | | |
| Productivity (g/mmolV/hr) | 2300 | 1700 | 2000 | 1200 |
| Kinetic Profile (type) | A | B | B | B |

TABLE 1-continued

| SMALL SCALE POLYMERIZATIONS | | | | |
|---|---|---|---|---|
| Example | 1 | 2 | 3 | 4 |
| Propylene (wt. %) in polymer | 25 | 25 | 25 | 25 |

EXAMPLE 5

Large Scale Polymerizations

Granular ethylene/propylene copolymer was produced in the fluidized reactor having an inner diameter of about 18 inches with vanadium precursors prepared using the one-step (single stage) or two-step (two stage) reduction procedures described above to produce, in the context of the process, the "one-step catalyst precursor" or the "two-step catalyst precursor," respectively. The catalyst precursor made using a one-step procedure was that used in Example 1. The catalyst precursor made using a two-step reduction was that used in Example 2.

Triisobutylaluminum or triethylaluminum (TEAL) was used at the cocatalyst. Chloroform was used as the promoter. The reactor total pressure was maintained at about 300 psig. The partial pressure of ethylene was about 50 to 130 psia. The $H_2/C_2$ mole ratio was varied from 0.0003 to 0.022 and was typically about 0.001 to 0.003. The $C_3/C_2$ mole ratio was varied from 0.12 to 0.42 and was typically about 0.33. The superficial gas velocity in the fluidized bed reactor was in the range of about 1.0 to 1.4 ft/s. Reactor bed temperature was varied as needed in an attempt to keep below the softening point of the particular resin composition being produced at any point in time.

The reactor was initially operated smoothly for 74 hours with the two-step catalyst precursor producing polymers with densities ranging from 0.929 g/cc to 0.875 g/cc. The propylene contents on selected samples that were measured ranged from about 6% by weight to about 18% by weight. The products had melt indices from 0.08 to 0.7 dg/min. The first shutdown occurred while operating at 50° C. when a 0.875 g/cc density polymer was being produced above its softening temperature. The two-step catalyst precursor was used throughout this initial operating period and during the subsequent start-up which went smoothly. Smooth operation over a period of 19 hours then occurred at 40°–50° C. making 0.877 to 0.885 g/cc density product with 0.1 to 0.5 dg/min melt index. Then the one-step reduced catalyst precursor began to be used instead of the two-step catalyst precursor. Within three hours the reactor was shut down by agglomerated polymer chunks and sheets. At that time the reactor temperature was 43° C. and the product being made was 0.877 g/cc density and 0.28 dg/min melt index. In the subsequent start-up the one-step reduced catalyst precursor was employed, but the reactor was shut down after only 6 hours due to the formation of about 12 one-foot diameter fused resin boulders. The reactor was then restarted successfully using the rereduced catalyst precursor and operated for 78 hours producing granular resin with densities from 0.892 to 0.864 g/cc and propylene contents up to 30% by weight at 31° to 40° C. The series of experiments continued for five more weeks using the two-step catalyst precursor only. Nine more start-ups were attempted and all were successful. Normal reactor operation was sustained until a mechanical failure occurred, or the reactor was operated above the softening temperature of the resin being produced, or other experimental variations perturbed the operation. The reactor was operated at temperatures as low as 25° C. and resins were produced with propylene contents as high as 33% by weight. Resin densities were as low as 0.859 g/cc.

This example demonstrates the improved operability during start-ups and continuous operation of a fluid bed reactor producing EPR polymer using the stage-modified catalyst.

EXAMPLE 6

Granular ethylene/propylene copolymer, with or without ethylidene norbornene addition, was produced in a fluidized bed reactor having an inner diameter of about 14 inches with vanadium catalyst precursors prepared using one-step or two-step reduction procedures as described above. The catalyst precursors had vanadium contents in the range of 1.1 to 1.5 weight % vanadium and typically had 1.4 weight % vanadium. The aluminum contents ranged from 1.6 to 3.2 weight % Al on the catalyst precursor and were typically 2.7 weight % Al.

Triisobutylaluminum or triethylaluminum was used as the cocatalyst. Chloroform, trichlorofluoromethane or 1,1,1-trichloroethane was used as the promoter. The reactor total pressure was typically maintained at 300 psig. The partial pressure of ethylene was typically 120 psia with a range of 65 to 130 psia. The $H_2/C_2$ mole ratio was varied from 0.0006 to 0.020 and was typically about 0.003. The $C_3/C_2$ mole ratio was varied from 0.16 to 0.35 and was typically about 0.25. The reactor temperature was typically 30° C. with a range of 10° to 50° C.

A total of 70 start-up attempts were made of which some were successful and some were not. A start-up was considered successful if the reactor operated for two or more days after initiating the polymerization reaction. Ethylidene norbornene was present in the reactor for some start-up attempts and not others. Table 2 below shows the numbers of start-ups attempted and the number successful under the four possible combinations of conditions cited herein. The data show a significant improvement in successful start-ups using the rereduced catalytic process of this invention.

TABLE 2

| Start-Up Success Rates With Large Scale Polymerizations | | | | |
|---|---|---|---|---|
| Type of Start-Up | A | B | C | D |
| No. of Reduction Modification Steps | 1 | 1 | 2 | 2 |
| Use of ethylidene norbornene | No | Yes | No | Yes |
| No. of Start-ups of type attempted | 28 | 3 | 23 | 16 |
| No. of Start-ups of type successful | 7 | 1 | 13 | 14 |
| Percent (%) successful start-ups | 25 | 33 | 57 | 88 |

We claim:

1. A process for making essentially non-agglomerated ethylene polymers which comprises polymerizing ethylene in a fluid bed containing a stage-modified high activity vanadium catalyst under polymerization conditions that normally would yield an undesirable amount of agglomerated polymer with non-stage modified high activity vanadium catalysts, said catalyst being a modification of the Beran et al. Catalyst System comprising a catalyst precursor comprising a supported electron donor-complexed vanadium halide component, a cocatalyst and a promoter, wherein the complexed vanadium halide component in the catalyst precursor is obtained by a multistage reduction with a reducing agent containing a Group 13 element in which the vanadium halide component is first reduced to an intermediate stage to a level of about 0.15 to about 1.0 mmoles of the Group 13 element per gram of supported precursor, dried, reslurried and further reduced by one or more of adding more modifier and converting unreduced modifier present so as to achieve a total level of about 1.0 to about 3.0 mmoles of the Group 13 element per gram of supported precursor.

2. The process of claim 1 wherein the modifier is a composition of the formula:

$$MX_aR_{(3-a)} \qquad (I)$$

wherein M is either boron or Al and wherein each R is independently alkyl provided that the total number of aliphatic carbon atoms in any one R group may not exceed 14; X is chlorine, bromine or iodine; and a is 1–2 with the provision that when M is boron, a is 3.

3. The process of claim 2 wherein ethylene, and at least one of propylene and one or more of an additional α-olefin and, optionally, a diene are copolymerized to produce a copolymer normally viewed to be a wholly or partly elastomeric polymer inclusive of: ethylene/propylene rubbers and ethylene/propylene/diene rubbers comprising ethylene/propylene/ethylidenenorbornene and ethylene/propylene/hexadiene; ethylene/butene rubbers; ethylene/butene/diene rubbers; and very low density ethylene polymers which are not wholly elastomeric comprising ethylene/propylene copolymers and ethylene/propylene/diene terpolymers inclusive of ethylene/propylene/ethylidenenorbornene and ethylene/propylene/hexadiene terpolymers.

4. The process of claim 1 wherein ethylene and α-olefin are polymerized in the fluid bed.

5. The process of claim 4 wherein the α-olefin is propylene.

6. The process of claim 4 wherein there is added a diene to the fluid bed polymerization reaction.

7. The process of claim 5 wherein there is added a diene to the fluid bed polymerization reaction.

8. The process of claim 1 wherein the polymerization conditions include a reaction temperature of about 0° C. to about 115° C.

9. The process of claim 4 wherein the polymerization conditions include a reaction temperature of about 0° C. to about 115° C.

10. The process of claim 5 wherein the polymerization conditions include a reaction temperature of about 0° C. to about 115° C.

11. The process of claim 6 wherein the polymerization conditions include a reaction temperature of about 0° C. to about 115° C.

12. The process of claim 7 wherein the polymerization conditions include a reaction temperature of about 0° C. to about 115° C.

* * * * *